Figure 1:
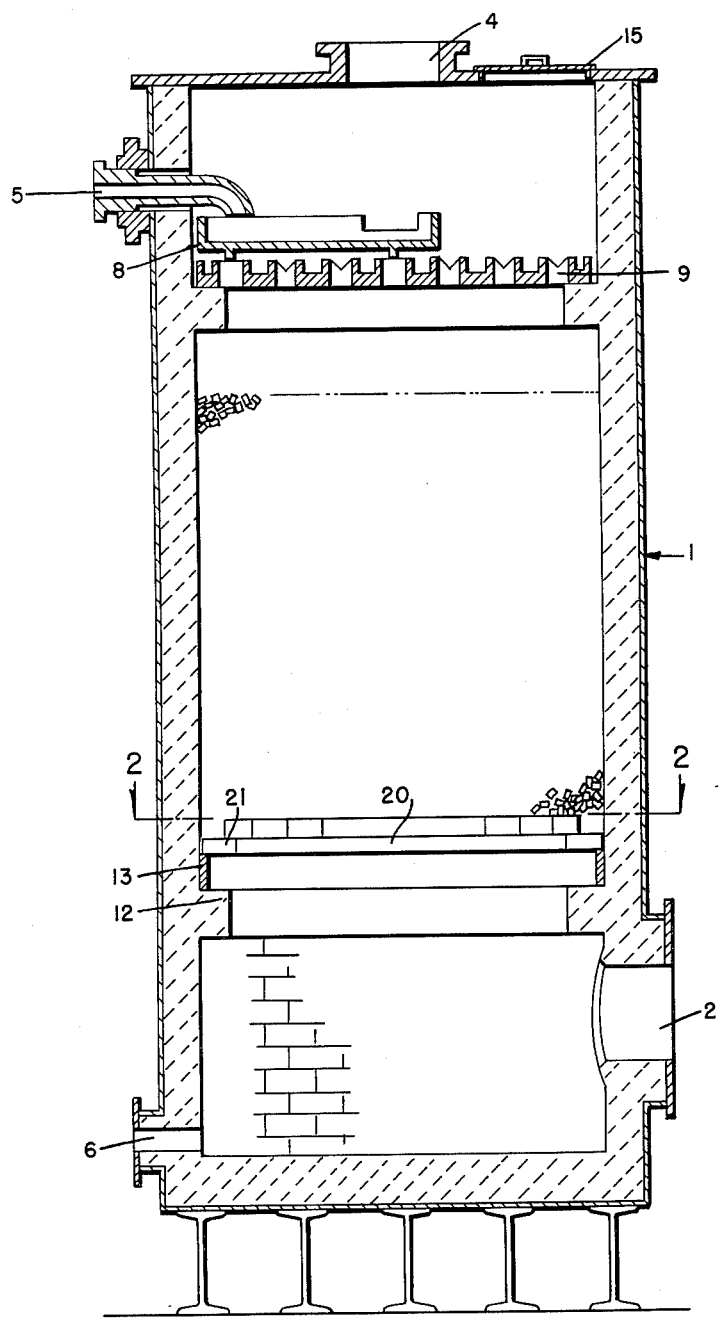

FIG. I

INVENTOR.
JOHN S. ECKERT

Nov. 20, 1962
J. S. ECKERT
3,064,954
SUPPORT PLATE
Filed Nov. 13, 1958
2 Sheets-Sheet 2
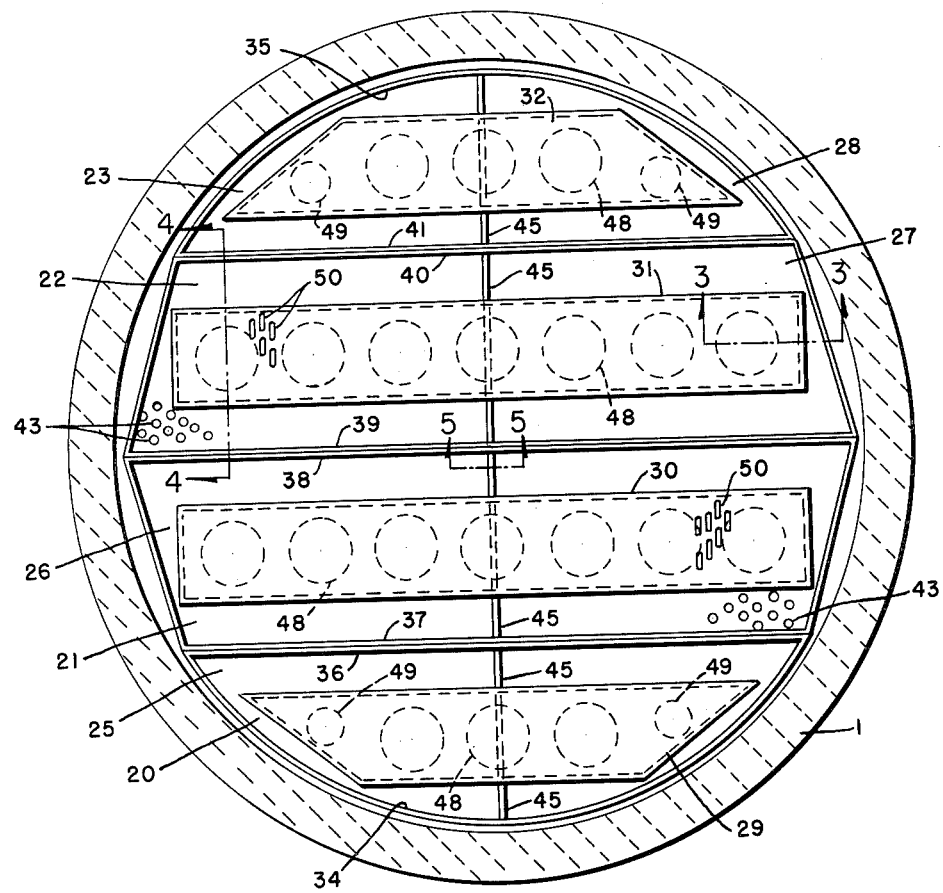
FIG. 2
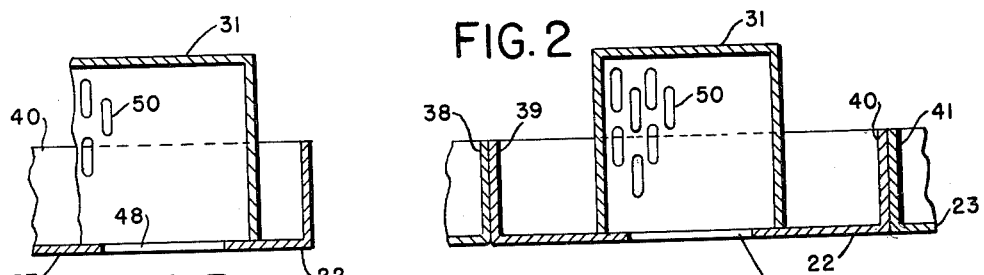
FIG. 3
FIG. 4
FIG. 5
INVENTOR.
JOHN S. ECKERT
BY
ATTORNEY

# United States Patent Office 3,064,954
Patented Nov. 20, 1962

3,064,954
SUPPORT PLATE
John S. Eckert, Silver Lake, Ohio, assignor to The United States Stoneware Company, Tallmadge, Ohio, a corporation of Ohio
Filed Nov. 13, 1958, Ser. No. 773,784
8 Claims. (Cl. 261—98)

This invention relates to a support plate for support of the packing elements in a packed treating tower. The tower is used for bringing a gas and a liquid into intimate contact so as to effect either a mass transfer or a heat transfer from one to the other.

The support plate must be perforate to permit gases to pass up through it, and liquids to pass down through it. The gases pass through openings in channels which extend at least almost from one side of the tower to the other. These are above a substantially horizontal, perforate drain plate through which the liquid drains. The channels reinforce the drain plate and tend to keep it from sagging. The support plate may be made with a one-piece drain plate, or the drain plate may be made in two or more sections, each with its own channel. The support plate is preferably made in elongated sections which extend from one side of the tower to the other, and if there is a manway in the tower the sections are advantageously of a width to be passed through it. In the preferred construction, each drain plate extends under the whole of its channel with several relatively large openings in the plate under the channel to give the gas access to the underside of the channel. In this preferred construction, the drain plate and channel are made of separate pieces of sheet metal and the edges of each drain plate are advantageously bent up to give rigidity to the drain plates and to provide means for fastening the several sections of the support plate together. A channel may be drawn into a drain plate, but the reinforcing effect of the drain plate under the channel is then lost and other reinforcing means will usually be required. Also, if the channel and drain plate are made of a single piece of metal it is more difficult to suitably ratio the strength of the structure with the open areas. Although the support plate is preferably made of steel, all or a part of it may be made of other metal, plastic, etc.

The channels increase the surface area of the support plate and provide a greater area of perforations than is possible in a flat plate. Also the channels strengthen the plate, reducing or eliminating sag. Likewise, with respect to the liquid flowing down through the tower, the channeled plate construction provides a location for disengagement of this liquid from the plate which is below the location at which the gas passing up through the channel passes through the openings in the plate. This makes for efficient operation by preventing entrainment in the gas of drops of the down-flowing liquid leaving the support plate.

The total open area in each channel is preferably at least substantially as great as the flat area of the section. Thus the support plates do not noticeably obstruct the flow of gas. The liquid draining down through the tower fills a substantial portion of the perforations in the drain plate, and preferably builds up to a substantial depth on the horizontal portion of the drain plate, so that no gas flows up therethrough, and to compensate for this obstruction to counterflow of the gas, channels are provided, the total open area of each of which is nominally greater than the area they cover.

In the preferred form of the invention, the support plate is formed in sections and each section is formed of a drain plate and a channel. Fastened to the top of each drain plate is a channel, all surfaces of which are preferably perforated with small openings. It extends at least most of the length of the drain plate and is somewhat narrower than it. The area of the drain plate around the channel, is perforated with small holes. These openings and the openings in the channel are so small that the packing elements cannot pass through them.

In the drain plate, under the channel, are one or more large openings for the passage of gas to the underside of the channel. To retain maximum strength, these openings are preferably circular or oval and somewhat less in diameter than the width of the channel. The distance between them is about equal to the radius of the openings but may vary so long as enough metal is left to provide the needed transverse strength. Oval openings can be used but are not as economical to produce as circular openings. Closely spaced diagonal quadrilateral openings can be used. The number, shape, and size of the openings will be chosen with a view to the amount of reinforcement required.

The openings in the drain plates around the channels are of any convenient shape, and are small so that liquid tends to collect on the drain plates, but preferably without forming any substantial head. This is to drain off liquid and yet maintain strength. The channels are perforated, preferably with elongated perforations to provide maximum open area with minimum loss in strength.

Since the several sections of the support plate are each self-supporting and their ends rest on a ring which projects inwardly near the bottom of the tower, there is no need for fastening them together, although there is no objection to this.

The invention will be further described in connection with the accompanying drawings, in which—

FIG. 1 is a section through a tower;
FIG. 2 is a plan view on the line 2—2 of FIG. 1;
FIG. 3 is a sectional view on the line 3—3 of FIG. 2;
FIG. 4 is a sectional view on the line 4—4 of FIG. 2; and
FIG. 5 is a sectional view on the lines 5—5 of FIG. 2.

The tower is formed of a cylindrical, lined metal shell 1 provided with a gas inlet 2 near the bottom and a gas outlet 4 at the top. A liquid inlet 5 is provided near the top, and liquid drains through the outlet 6. The liquid is distributed in the top of the tower by any suitable means such as the usual cross distributor 8 and weir-type distributor 9.

The tower is provided with a shoulder 12 above the gas inlet, and the support plate of this invention rests on a support ring 13 preferably made of metal sections which rest on shoulder 12. Alternatively, individual discontinuous supports may support the support plate. The tower shown and described is illustrative of all packed treating towers in which a support plate is provided. The manway 15 is optional.

The support plate shown is formed of four sections 20, 21, 22 and 23. These are formed of the drain plates 25, 26, 27 and 28, and the four channels 29, 30, 31 and 32. The edges of the drain plates are turned up on all sides to form the curved outside walls 34 and 35 and the adjacent intermediate walls 36—37, 38—39, 40—41. Matched perforations may be provided at the bottom of adjoining turned-up edges of the drain plates to provide a uniform depth of liquid in all of them. The area of the drain plates around the channels is perforated with the small openings 43. Each section is preferably provided with a solid stiffener 45, the ends of which are preferably welded to the inner surfaces of the side walls of the section, although they may be fastened in the respective sections in any desired manner.

Large circular openings 48 are provided in the drain plates under the channels for the upward passage of gas, and in the two end sections there are additional smaller openings 49. The top and all walls of the various channels are covered with small openings 50 for the upward escape of the gas. They may be round, oval or any suitable shape. If elongated, as shown, fabrication is facilitated if all elongations extend in the same direction in any single sheet.

If the tower contains no manway, the support plate is assembled before the tower is covered, and if repairs or replacements are required after the tower has been in use, the cover must be removed for removal of any section. The preferred tower construction includes a manway in the side or the top of the tower large enough for the individual sections to be passed lengthwise through it, as required.

The support plate holds the packing elements. These may be ceramic, metal, plastic or of any composition. They may be saddles, cylinders or any other shape. The bed of packing elements will be of any desired shape. They bring the upwardly flowing gas into large-surface contact with the downwardly flowing liquid. As the liquid reaches the support plate, the upward flow of gas through the openings 50 in the channels tends to prevent liquid from flowing through these openings. Most of the liquid flows over the outer surface of the channel, onto the drain plate. In the preferred operation, the pressure of the gas below the drain plate prevents ready flow of the liquid through the openings 43 until a small head of the liquid has been built up over these openings. A chief advantage of this type of support plate structure is that the location of the disengagement of the liquid from the support plate is below the location where the gas passes through the support plate. This prevents drops of the liquid from becoming entrained in the upward flow of gases which would return it to the bed of packing elements.

Modifications may be made in the structure as more specifically disclosed. For instance, instead of being cylindrical, the cross section of the tower may be oval, hexagonal, or any other desired shape. It may be constructed of any suitable material. Also modifications may be made in the support plate, the packing elements, etc. Any suitable reinforcement means may be utilized.

The invention is covered in the claims which follow.

What I claim is:

1. In a packed treating tower with a support plate and a bed of packing elements on the support plate, a gas inlet and liquid outlet below the support plate, and a gas outlet and liquid inlet above the bed; the improvement constituted of a support plate composed of elongated sections which extend from one edge of the support plate to the other, each section being composed of a drain plate which extends from one end of the section to the other and an elongated raised gas-passing portion thereon which is narrower than the section and extends at least almost from one end of the section to the other and reinforces it against sagging, all surfaces of said gas-passing portion and the area of the drain plate which extends away from it being perforated with holes so small that the elements will not pass through them, with the drain plate extending in under the edges of each gas-passing portion with only several relatively large openings therein for the passage of gas therethrough each of said relatively large openings being much larger than the aforesaid holes with the largest dimension of each such opening approaching the width of the gas-passing portion whereby the extension of the drain plate under its raised gas-passing portion with only a few relatively large openings in it adds strength to the support plate.

2. In a packed treating tower with a support plate and a bed of packing elements on the support plate, a gas inlet and liquid outlet below the support plate, and a gas outlet and liquid inlet above the bed; the improvement constituted of a support plate composed of elongated sections which extend from one edge of the support plate to the other, each section being composed of a drain plate which extends from one end of the section to the other and an elongated raised gas-passing portion thereon which is narrower than the section and extends at least almost from one end of the section to the other and reinforces it against sagging, all surfaces of said gas-passing portion and the area of the drain plate which extends away from it being perforated with holes so small that the elements will not pass through them, with the drain plate extending in under the edges of the gas-passing portion and having several relatively large openings therein for the passage of gas therethrough, with the outer edge of the drain-plate portion of each section turned up to reinforce it against sagging and to make it capable of retaining a body of liquid on the drain plate.

3. In a packed treating tower with a support plate and a bed of packing elements on the support plate, a gas inlet and liquid outlet below the support plate, and a gas outlet, a liquid inlet and a manway above the bed; the improvement constituted of a support plate composed of sections each of which extends across the support plate from one edge thereof to the other and is narrow enough to be passed through the manway, each section being composed of a drain plate substantially in one plane with many openings therein, and a raised gas-passing portion which is narrower than the section and extends almost the entire distance from one end of the section to the other and reinforces it against sagging, with many openings in all surfaces of the gas-passing portion, all of the aforesaid openings in the gas-passing portion being too small to permit the passage of a packing element therethrough, the drain plate extending inwardly under the edge of the gas-passing portion with a plurality of relatively large circular openings therein under the gas-passing portion for the passage of gas therethrough.

4. In a packed treating tower with a support plate and a bed of packing elements on the support plate, a gas inlet and liquid outlet below the support plate, and a gas outlet, a liquid inlet and a manway above the bed; the improvement constituted of a support plate composed of sections each of which extends across the support plate from one edge thereof to the other and is narrow enough to be passed through the manway, each section being composed of a flat, sheet-metal drain plate and an inverted channel formed from sheet metal fastened to the top of said drain plate which extends under substantially the whole of the channel, the channel being narrower than the drain plate and extending almost from one end thereof to the other and reinforcing it against sagging, substantially all portions of said channel and the area of the drain plate which extends outwardly from the channel having openings therein so small that the packing elements do not pass therethrough, and the portion of the drain plate under the channel having several large openings therein for the passage of gas therethrough.

5. A support plate for a packed treating tower composed of sections each of which includes a drain plate and an inverted channel fastened thereon which is narrower than the section and extends at least almost the length of the section and reinforces it against sagging, the drain plate extending outwardly from each side of the channel, all surfaces of the channel and the portion of the drain plate which extends outwardly therefrom being perforated with small openings, the drain plate extending under the channel with large openings therein for the passage of gas to the under side of the channel, each of said large openings being much larger than the small openings with the largest dimension of each large opening approaching the width of the channel.

6. The support plate of claim 5 in which the large openings in the drain plate are circular.

7. The support plate of claim 5 in which the side edges of each drain plate are turned up.

8. The support plate of claim 5 in which all side edges of each drain plate are turned up, and a stiffening plate extends from between the turned-up side edges and has its ends fastened thereto.

References Cited in the file of this patent

UNITED STATES PATENTS

| | | |
|---|---|---|
| 548,174 | Bradburn | Oct. 22, 1895 |
| 665,995 | Colles | Jan. 15, 1901 |
| 1,141,266 | Raschig | June 1, 1915 |
| 2,143,015 | Kleinschmidt | Jan. 10, 1939 |
| 2,511,118 | Matheson | June 13, 1950 |
| 2,803,528 | Erdmann | Aug. 20, 1957 |
| 2,860,860 | Wilson | Nov. 18, 1958 |

FOREIGN PATENTS

| | | |
|---|---|---|
| 951,153 | France | Apr. 11, 1949 |

OTHER REFERENCES

U.S. Stoneware Co. Bulletin #TA-30, Sept. 1, 1957.